(12) United States Patent
Tveiterås et al.

(10) Patent No.: US 11,415,237 B2
(45) Date of Patent: Aug. 16, 2022

(54) DRILL STRING SAFETY VALVE DEVICE

(71) Applicant: Moonshine Solutions AS, Bergen (NO)

(72) Inventors: Jan Georg Tveiterås, Bergen (NO); Helge Hope, Bergen (NO); Alf Breivik, Ulvik (NO)

(73) Assignee: Moonshine Solutions AS, Bergen (NO)

( * ) Notice: Subject to any disclaimer, the term of this patent is extended or adjusted under 35 U.S.C. 154(b) by 165 days.

(21) Appl. No.: 16/759,247

(22) PCT Filed: Oct. 26, 2018

(86) PCT No.: PCT/NO2018/050258
§ 371 (c)(1),
(2) Date: Apr. 24, 2020

(87) PCT Pub. No.: WO2019/083377
PCT Pub. Date: May 2, 2019

(65) Prior Publication Data
US 2020/0347947 A1    Nov. 5, 2020

(30) Foreign Application Priority Data

Oct. 27, 2017 (NO) .................................. 20171719

(51) Int. Cl.
*F16K 17/168* (2006.01)
*F16K 17/04* (2006.01)
(Continued)

(52) U.S. Cl.
CPC ........ *F16K 17/168* (2013.01); *F16K 17/0406* (2013.01); *E21B 21/106* (2013.01); *E21B 2200/04* (2020.05); *F16K 15/1823* (2021.08)

(58) Field of Classification Search
CPC .............. F16K 17/168; F16K 17/0406; E21B 2200/04; E21B 2200/05; E21B 21/106
(Continued)

(56) References Cited

U.S. PATENT DOCUMENTS 1,482,233 A * 1/1924 Hewitt .................. F16K 17/168
251/83
2,884,004 A * 4/1959 Dierdorf ............... F16K 17/168
137/522

(Continued)

FOREIGN PATENT DOCUMENTS

CN 201027501 Y 2/2008
CN 205936513 U 2/2017
(Continued)

OTHER PUBLICATIONS

Norwegian Search Report dated May 26, 2018 in patent application No. NO20171719, 2 pages.
(Continued)

*Primary Examiner* — P. Macade Nichols
(74) *Attorney, Agent, or Firm* — Kilpatrick Townsend & Stockton LLP

(57) ABSTRACT

A drill string safety valve device (1) has a body (2) with a through-going flow bore (25) and connectors (3, 4) at respective ends (19, 18) for connection to tubulars, such as pipe joints. A valve member (7; 29) is movably arranged in said flow bore (25) and configured for being set in one of two states: a first state of the valve member allows fluid to flow in both directions though the flow bore, and a second state of the valve member allows fluid flow through the flow bore in only one direction. The valve member may be a rotatable ball valve (7) with a through-going flow bore (21).

11 Claims, 5 Drawing Sheets

(51) Int. Cl.
*E21B 21/10* (2006.01)
*F16K 15/18* (2006.01)

(58) Field of Classification Search
USPC .............................................. 137/533.17, 539
See application file for complete search history.

(56) References Cited

U.S. PATENT DOCUMENTS

| | | |
|---|---|---|
| 3,494,417 A | 2/1970 | Fredd |
| 4,291,722 A | 9/1981 | Churchman |
| 4,337,717 A | 7/1982 | Gregory |
| 4,660,596 A | 4/1987 | Ashford |
| 5,246,203 A | 9/1993 | McKnight et al. |

FOREIGN PATENT DOCUMENTS

| | | |
|---|---|---|
| CN | 207033379 U | 2/2018 |
| GB | 2099045 A | 12/1982 |
| WO | 99/25802 A1 | 5/1999 |
| WO | 2017/053668 A1 | 3/2017 |

OTHER PUBLICATIONS

Notification of Transmittal of the International Search Report, and the Written Opinion of the International Searching Authority, dated Feb. 13, 2019 in the PCT/NO2018/050258, 15 pages.
"Bin cleaning," published Jun. 14, 2017 (TV transcript Jun. 24, 2014).

\* cited by examiner

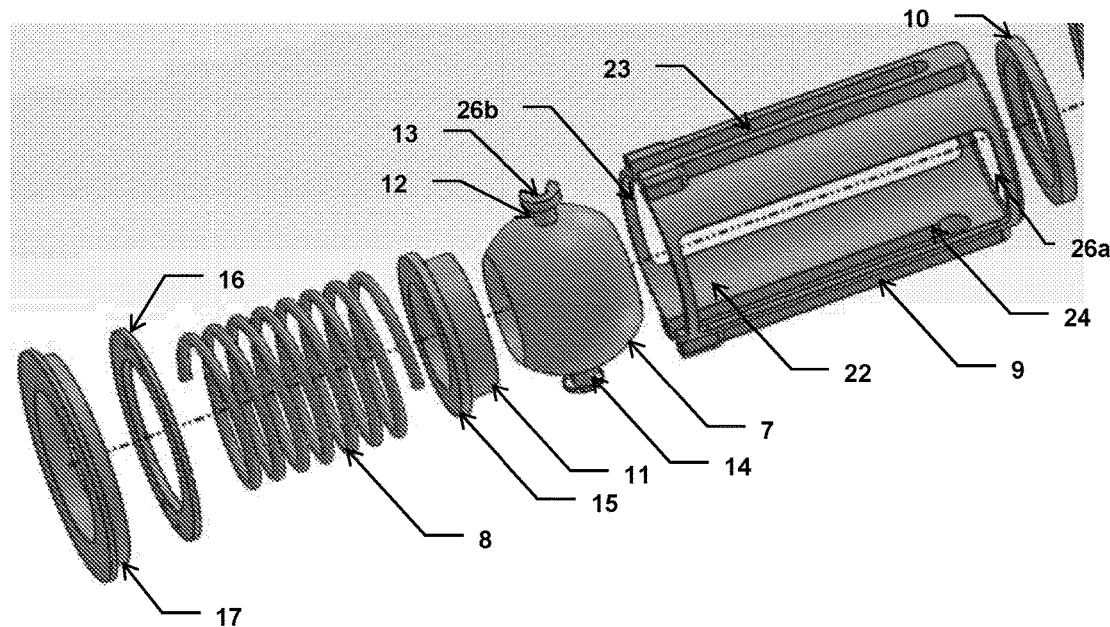
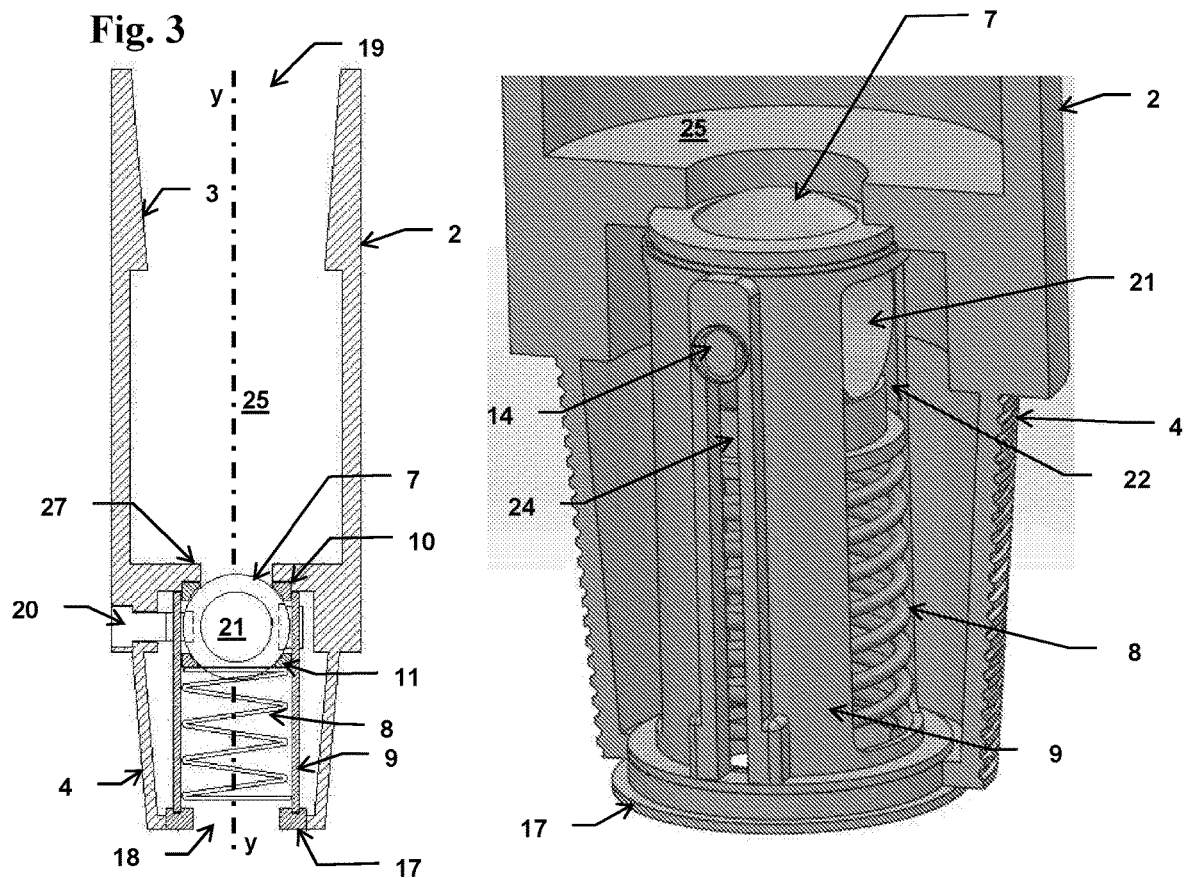
Fig. 3
Fig. 4
Fig. 5

DRILL STRING SAFETY VALVE DEVICE

CROSS REFERENCE TO RELATED APPLICATIONS

This application is a national stage application, filed under 35 U.S.C. § 371, of International Patent Application No. PCT/NO2018/050258, filed Oct. 26, 2018, which claims priority to Norwegian Patent Application No. 20171719, filed Oct. 27, 2017, which are incorporated by reference herein in their entirety.

FIELD OF THE INVENTION

The invention concerns the field of drilling into fluid reservoirs in earth formations. More specifically, the invention concerns an improved valve for controlling pressures inside a drill string when drilling into a fluid reservoir in an earth formation. The invention is particularly useful for controlling pressure variations inside a drill string when drilling into subterranean reservoirs.

BACKGROUND OF THE INVENTION

Drilling wells into subterranean reservoirs containing hydrocarbon fluids and/or water, be it on an onshore location or a subsea seabed, requires a continuous monitoring and control of the fluid pressure inside the drill string. Hydrocarbon wells are subjected to rapid pressure differentials that may cause great damage and be catastrophic for the drilling rig and rig personnel if uncontrolled. Safety valves that are connected to, and form a part of, the drill string are essential components for ensuring the safety of drilling operations. Such valves may be used as safety valves on the rig floor as well as down-hole, to manage safe operations by controlling kicks and preventing back-flow of the drilling mud inside the drill string during drilling operations.

Various types of drilling safety valves exist. One example is the so-called "Kelly Valve", which is a manually operated ball valve used to close the bore of the drill string and stop backflow. The Kelly Valve is designed for high-pressure conditions and can hold pressure from both directions, and is normally screwed into the top of a drill string, below the top drive, where it may be operated by a drill floor worker. The Kelly Valve is also often referred to as a "Full Opening Safety Valve" (FOSV), because when the ball valve is in the open position; the flow path through the valve has a smooth inside diameter. During drilling operations, Kelly Valves matching the applicable sizes of drill pipe, drill collar, tubing, etc. need to be available on drill floor, ready to be stabbed in. When abnormal situations occur and a predefined pressure limits is exceeded, the drill floor worker can close the Kelly Valve to stabilize the pressure inside the drill string and avert a potential kick. One example of a Kelly Valve is disclosed by U.S. Pat. No. 3,086,746. Another type of drilling safety valve for installation onto the drill string, is the so-called "Inside Blow-out Preventer Valve" (IBOP Valve), also commonly referred to as a "Gray Valve". The IBOP Valve is a check valve, which allows pumping through the valve and into the drillstring, but prevents upward flow.

One problem associated with the known drilling safety valves is their size and weight. Typically, each valve may weigh approximately 100 kg, requiring at least two drill floor workers to be located on the drill floor in order to install the valve into the drill string. The installation is time consuming, which is undesirable in an emergency situation.

It is therefore an object of the invention to provide a smaller, and thus lighter, drilling safety valve than those of the prior art.

SUMMARY OF THE INVENTION

The invention is set forth and characterized in the main claim, while the dependent claims describe other characteristics of the invention.

It is thus provided a drill string safety valve device, comprising a body with a through-going flow bore and connectors at respective ends of the flow bore for connection to tubulars, characterized by a valve member movably arranged in said flow bore and configured for being set in one of two states, wherein a first state of the valve member allows fluid to flow in both directions though the flow bore, and wherein a second state of the valve member allows fluid flow through the flow bore in only one direction.

In one embodiment, the valve member comprises guide-and-support means whereby the valve be moved between the two states. The valve member may be movably arranged on a first support member and the valve member is configured to bear against a first valve seat. In one embodiment, the first valve seat is arranged on the first support member. The drill string safety valve device comprises a resilient element, such as a spring, configured to exert a force on the valve member.

In one embodiment, the valve member comprises a rotatable ball valve having a through-going flow bore.

In another embodiment, the valve member comprises a valve head movably connected to a second support member, and the second support member is movably connected to the first support member.

The drill string safety valve device further comprises operating means configured for operating the valve member between said two states.

The drill string safety valve device body is in one embodiment a tubular body having an outer diameter corresponding to the outer diameter of the tubulars to which it may be connected.

A common principle of both of the embodiments of the invented safety valve device is its dual functional capability: as check valve and as a full opening safety valve. The change between these two states (or configurations) is effectuated by moving the valve member (e.g. ball valve or the valve head) inside the valve body. Preferably, the valve member is moved along the body longitudinal axis. The valve member is preferably moved with respect to the valve cage.

The invented safety valve device is therefore in effect a combination of the above mentioned Kelly Valve and the Grey Valve, and as such provides greater flexibility and improved logistics, compared to the safety valves of the prior art. The invented safety valve device may be made compact, and weights on the order of 25 kg have been envisaged. However, the invention shall not be limited to weights or dimensions.

BRIEF DESCRIPTION OF THE DRAWINGS

These and other characteristics of the invention will become clear from the following description of an embodiment, given as a non-restrictive example, with reference to the attached schematic drawings, wherein:

FIG. 3 is an enlargement of the encircled area "A" in FIG. 2;

FIG. 4 is a sectional drawing of an embodiment of the invented valve device, in a forced-closed state;

FIG. 5 is a perspective, and partly cutaway, view of an embodiment of the invented valve device, in a forced-closed state, and thus corresponding to FIG. 4;

FIG. 7b is a perspective, and partly cutaway, view of the valve device and state as illustrated in FIG. 7a, but seen from a view diametrically opposite to that of FIG. 7a;

FIG. 9a is a perspective, and partly cutaway, view of the invented valve device in a static and locked-open state, and thus corresponding to FIG. 8;

FIG. 9b is a perspective, and partly cutaway, view of the valve device and state as illustrated in FIG. 9a, but seen from a view diametrically opposite to that of FIG. 9a;

DETAILED DESCRIPTION OF A PREFERENTIAL EMBODIMENT

Figure 1:
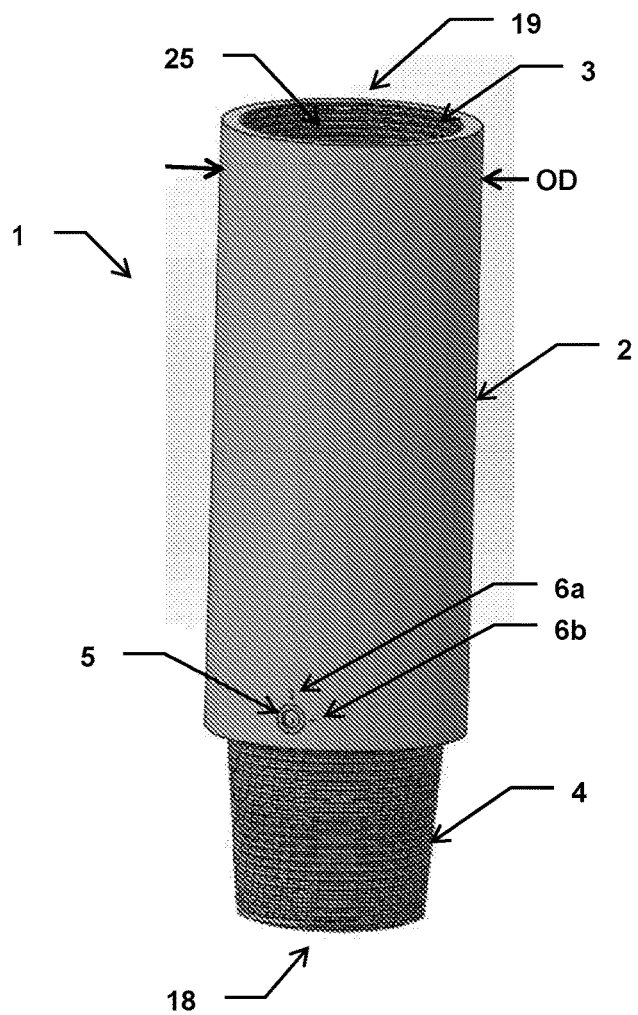
FIG. 1 is perspective view of an embodiment of the invented safety valve device.

The following description will use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Referring to FIG. 1, the invented safety valve device 1 comprises in the illustrated embodiment a tubular, elongated, body 2, with an axial, through-going, flow bore 25 and oppositely arranged openings 18, 19. A pin 4 and a box 3 are arranged at opposite axial ends of the body. In a practical application, the body 2 outer diameter OD will correspond to the outer diameter of the drill string joints (not shown) to which the safety valve will be connected. In use, the pin 4 is connected to a drill string joint (not shown) below the valve body 2, and the box 3 is connected to a drill string joint (not shown) above the valve body 2. Such connection means and methods are well known to the skilled person, and need therefore not be described in more detail here. The tubular, elongated, body 2 with an outer diameter corresponding to the drill string outer diameter, enables running the valve device downhole as a part of the drill string.

Also seen in FIG. 1 is the head of a valve actuator bolt 5. The actuator bolt 5 extends through an access bore 20 (see FIG. 2) in the body 2. In the illustrated embodiment, the head has a shape which is compatible with an Allen wrench whereby the bolt may be operated by e.g. a drill floor worker, but the skilled person will understand that the bolt head may have other shapes. Reference numbers 6a and 6d point to indicator markings on the valve body 2, where 6a indicates a locked-open valve (allowing backflow) and 6b indicates a check valve configuration (discussed below).

Figure 2:
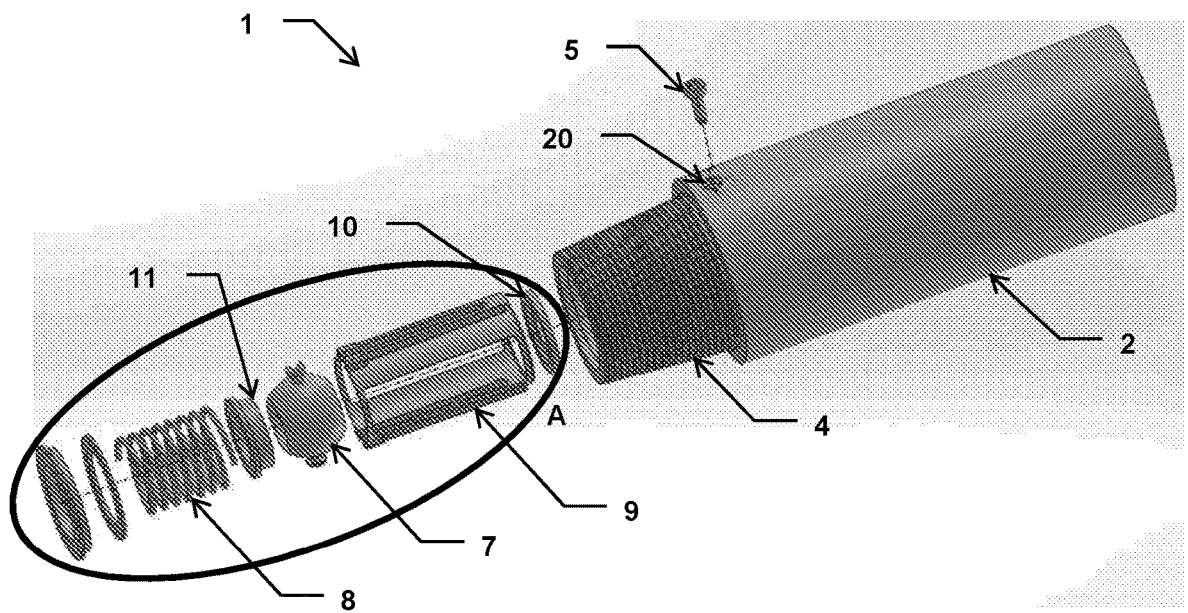
FIG. 2 is an exploded perspective view of the valve device illustrated in FIG. 1.

FIGS. 2 and 3, are exploded views of parts inside the valve body. It should be noted that seals, threads and other fasteners for assembly are not shown in the figures, as these features are well known for the skilled person and need therefore not be illustrated or described for the purpose of elucidating the invention. FIGS. 2 and 3 show a valve cage 9, having an elongated, tubular body, and configured for assembly inside the valve body 2. The valve cage 9 comprises flow openings 26a,b at opposite axial ends of the cage, and lateral flow openings 22. The valve cage 9 also comprises a pair of elongated, guide slots 23, 24 arranged at diametrically opposite sides of the cage and extending along the cage 9 (and valve body 2) longitudinal axis.

A ball valve 7 comprises a pair of guide pegs 12, 14 arranged at diametrically opposite sides of the ball valve. The first guide peg 12 is configured to be slidably arranged in the first guide slot 23, and the second guide peg 14 is configured to be slidably arranged in the second guide slot 24, as is explained in more detail below. The first guide peg 12 comprises at its free end a receptacle 13 having a geometry which is compatible with the above mentioned actuator bolt 5. The ball valve 7 may thus be operated (rotated) by inserting the actuator bolt in the receptacle 13 and then rotating the bolt.

A first (upper) valve seat 10 is arranged at one end of the cage 9 and configured for sealing engagement with the ball valve 7. A second (lower) valve seat 11 is arranged at the opposite end of the cage 9 and configured for sealing engagement with the ball valve 7. Integral with the second valve seat 11 is a first (upper) spring abutment ring 15. (It should be understood, however, that the second valve seat 11 and first spring abutment ring 15 may be separate parts.) Arranged between the first spring abutment ring 15 and a second (lower) spring abutment ring 16 is a coil spring 8 A retainer ring 17 serves to secure the above mentioned parts inside the valve body 2 flow bore 25 when assembled. Required threads and/or locking member to secure the retainer ring 17 to the valve body 2 are not illustrated, as such devices are well known in the art.

FIGS. 4 and 5 illustrate the safety valve device 1 in an assembled state. The retainer ring 17 is fixed to the valve body 2 and holds the valve parts in place inside the flow bore 25. The upper end of the valve cage 9 and the first (upper) valve seat 10 bear against a flow bore neck 27. The spring 8 forces the ball valve 7 along the body longitudinal axis y, against the first (upper) valve seat 10, and the ball valve thus prevents back-flow (i.e. upwards in FIG. 4). The ball valve 7 comprises a through-going flow bore 21, but in the ball valve position shown in FIGS. 4 and 5, the flow bore 21 is not aligned with the valve device flow bore 25, whereby flow through the ball valve flow bore 21 is prevented.

In this "forced-closed" configuration, wherein the ball valve is forced against the upper valve seat 10 by the spring force, the safety valve device 1 has the characteristics of a Grey Valve (i.e. a check valve configuration), preventing back flow through the valve body 2. It should be understood that the spring 8 will have to be designed and dimensioned (including the required resilience and stiffness) according to the intended use of the valve device.

Figure 6:
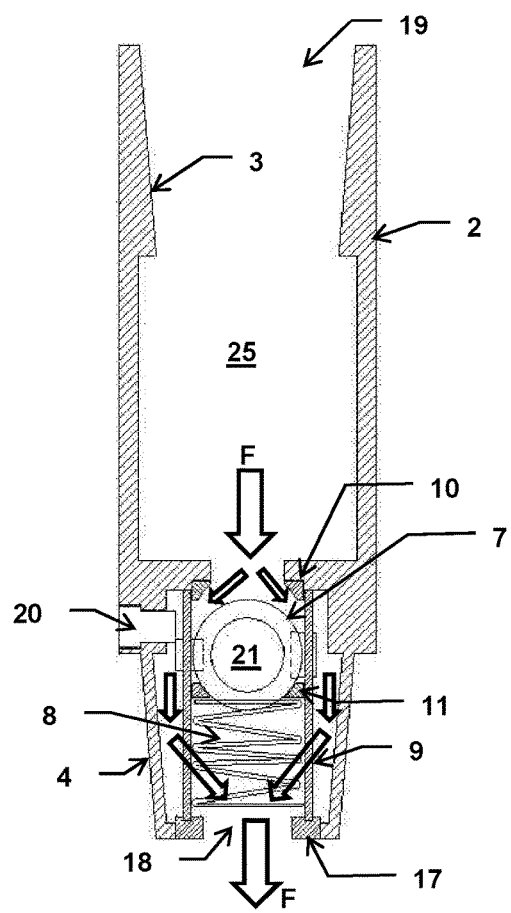
FIG. 6 is a sectional drawing of the invented valve device, in a forced-open state.
Figure 7A:
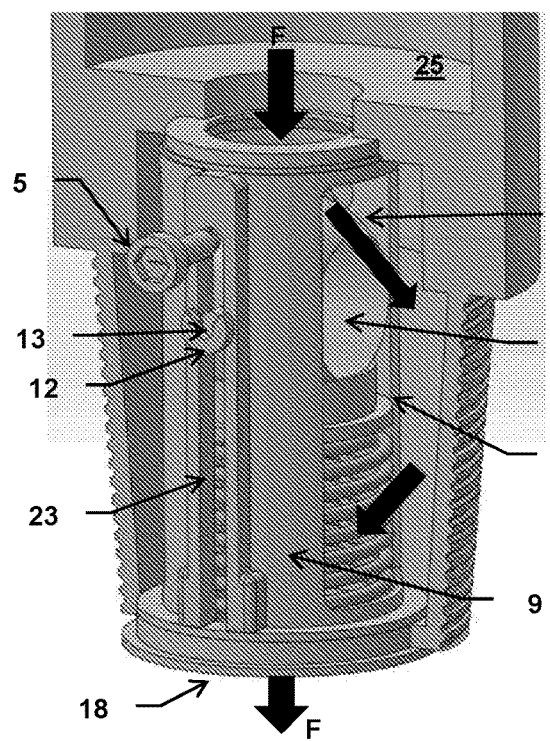
FIG. 7a is a perspective, and partly cutaway, view of the invented valve device, in a forced-open state, and thus corresponding to FIG. 6.
Figure 7B:
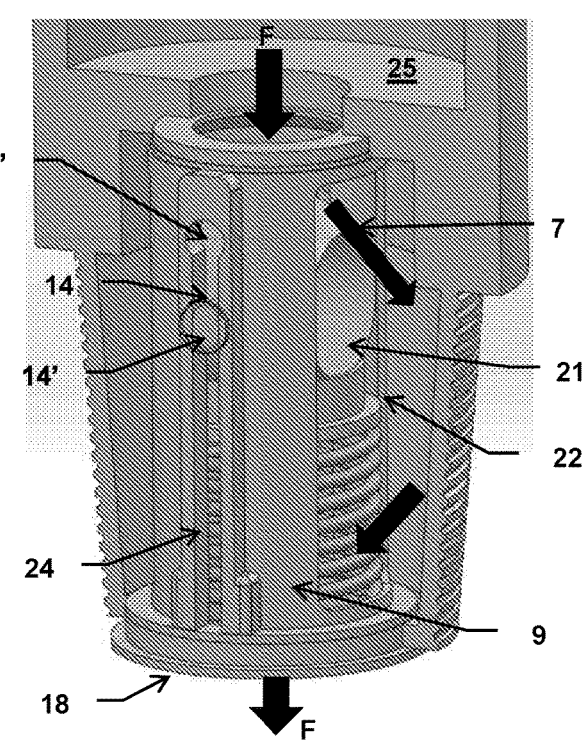

FIGS. 6, 7a and 7b show a valve configuration similar to that of FIGS. 4 and 5, but here a fluid F is applied from above, with pressure sufficient to overcome opposing force in the spring 8. The ball valve 7 is thus pressed downwards by the fluid F, whereby the fluid may flow around the ball valve 7 and out through the cage openings 22 into the flow bore outside the cage, and back in through the cage openings 22 and out of the valve body through the opening 18. The arrows indicate the flow path. Thus, these figures may be illustrative of a situation in which a drill fluid is pumped through the valve device and into the drill string below the valve device. Thus, in this "forced-open" configuration, the ball valve is forced away from the upper valve seat 10 by the fluid force.

Figure 8:
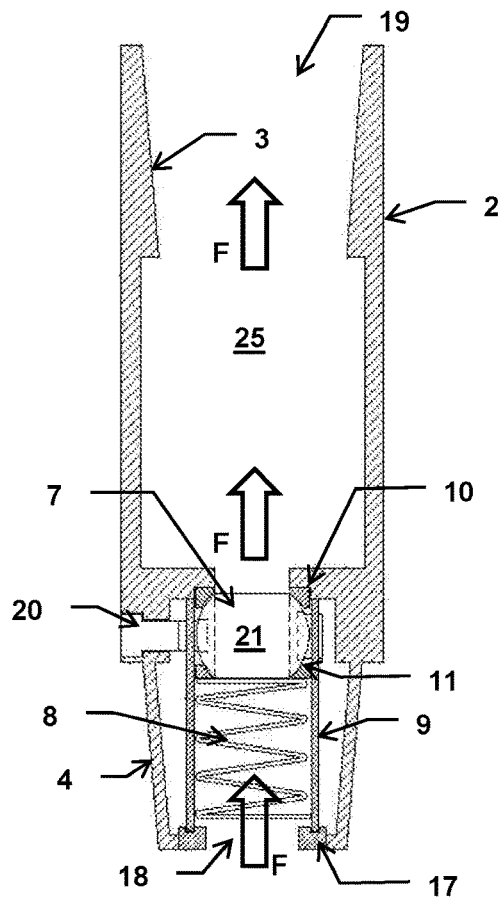
FIG. 8 is a sectional drawing of the invented valve device in a static and locked-open state.
Figures 9A, 9B:
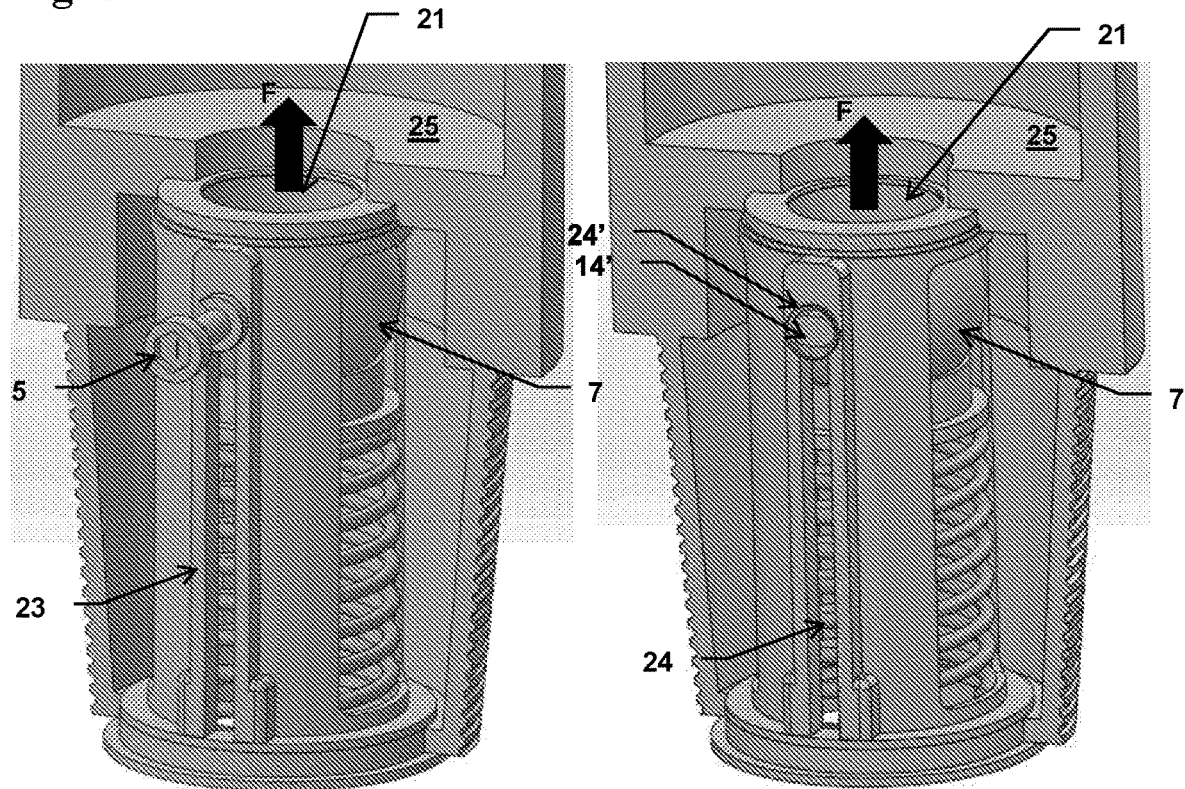

As discussed above, and as readily apparent from FIGS. 7a and 7b, the first guide peg 12 is configured to be slidably arranged in the first guide slot 23 (see FIG. 7a), and the second guide peg 14 is configured to be slidably arranged in the second guide slot 24 (see FIG. 7b). As shown in FIG. 7b, the free end 14' of the second guide peg 14 is shaped to allow movement in the second guide 24 slot only when the second guide peg is in certain orientation. In the illustrated embodiment, the peg free end 14' has an oblong cross-section with two opposite flat surfaces and is dimensioned such that the peg may travel in the second guide slot 24 only when flat surfaces are aligned with the guide slot, as shown in FIG. 7b. Referring to FIG. 7a, it will be understood that the ball valve 7 may be rotated by rotating the first guide peg 12, in the illustrated embodiment by rotating the actuator bolt 5 when the bolt is inserted in the receptacle 13. It will also be understood that such ball valve rotation is not possible when the second guide peg 14 free end 14' is in the second guide slot (as shown in FIGS. 7a and 7b). The ball valve 7 may only be rotated when the guide peg free end 14' is in the enlarged portion 24' (see FIG. 7b) at the upper end of the second guide slot 24. This configuration is illustrated in FIG. 9b, where the ball valve 7 has been rotated a quarter-turn, such that the guide peg free end 14' is lodged in the enlarged portion 24' and prevented from moving in the second guide slot 24. FIGS. 8, 9a and 9b thus illustrate the invented valve device in a static and "locked-open" state, in which the ball valve 7 is prevented from moving inside the valve cage. However, the ball valve 7 through-going flow bore 21 is aligned with the valve device flow bore 25 when the ball valve is in the position shown in FIGS. 8, 9a and 9b. Therefore, in this configuration, the valve device has an open, through-going bore (21 and 25) and fluid F (e.g. drill fluids) may flow upwards (backflow) through the valve device as indicated by the arrows. When the ball valve is in this position, the valve device may be installed onto the drill string, in case of upward flow, and subsequently closed to stop the upward flow.

In use, the invented valve device 1 may be placed in the top of a drill string, below the top drive, and set in a state as shown in FIGS. 8, 9a and 9b, i.e. with the ball valve flow bore 21 aligned with the valve device flow bore 25 and thus allowing uninhibited flow through the valve device. This state would be similar to the operation of a conventional Kelly Valve. When abnormal situations occur and a predefined pressure limits is exceeded, the drill floor worker may engage the actuator bolt 5 and rotate the ball valve to the state illustrated in FIGS. 6, 7a and 7b. In this state, the ball valve flow bore 21 does not permit flow through the ball valve, but the ball valve is movable in the guide slots 23, 24. In this state, the invented valve device is similar to an IBOP Valve (or Gray Valve), i.e. a check valve which allows pumping through the valve into the drillstring but prevents upward flow.

Figures 10A, 10B, 10C:
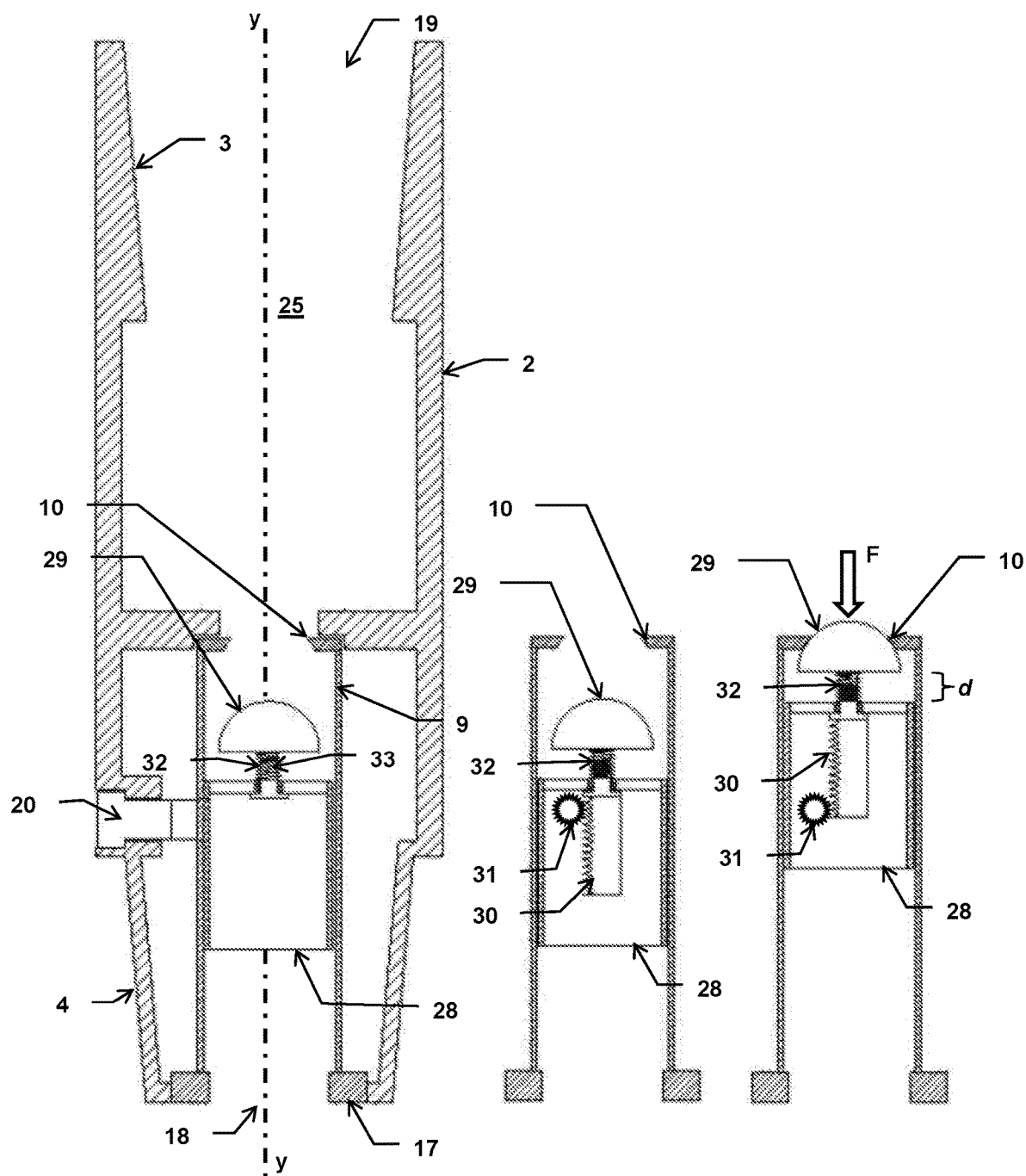
FIG. 10a is a sectional drawing of an alternative embodiment of the invented valve device, in a static and locked-open state.
FIG. 10b is a sectional drawing of the valve cage, inner valve cage and valve member of the embodiment of the invented valve device illustrated in FIG. 10a (i.e. in a static and locked-open state), and the where the view is rotated 90° around the body longitudinal axis y, compared to the view in FIG. 10.
FIG. 10c corresponds to FIG. 10b, but shows the valve member in a forced-closed state.

An alternative embodiment of the invented valve device is schematically illustrated in FIGS. 10a, 10b and 10c. In this embodiment, the ball valve (7, discussed above) has been replaced by a dome-shaped valve head 29 which is configured to seal against the upper valve seat 10. The valve head 29 is supported, via a stem 33, by an inner valve cage 28 which is slidably arranged inside the valve cage 9. Although not illustrated, it should be understood that the inner valve 28 comprises lateral flow openings similar to the lateral flow openings 22 in the valve cage 9, as described above. FIGS. 10a and 10b show the valve device in a static and locked-open state; i.e. the valve head 29 is retracted (lowered) from the upper valve seat 10 in order to allow flow through the valve device. Functionally, therefore, this configuration corresponds to the configuration illustrated in FIGS. 8, 9a and 9b and discussed above.

The inner valve cage 28 may be moved (along the body longitudinal axis y) inside the valve cage 9. As an example, this movement may be accomplished by a rack-and-pinion mechanism 30, 31, wherein the pinion 31 is operated (turned) by an actuator (not shown) extended through the access bore 20. Turning the pinion 31 will move the inner valve cage 28 by interaction with the rack 30.

In FIG. 10c, the pinion 31 has been turned so as to move the inner valve cage 28 upwards until the valve head 29 upper dome-shaped portion bears against the upper valve seat 10. A spring 32 is arranged between the valve head lower side and the inner valve cage and thus serves to force the valve head toward the valve set 10. Functionally, the configuration illustrated in FIG. 10c corresponds to the configuration illustrated in FIGS. 4 and 5 and discussed above (i.e. a check valve configuration).

When a pressure of a magnitude sufficient to overcome the force in the spring 23, the valve head 29 may be moved a distance d, away from the upper valve seat and towards the inner valve cage. This pressure may for example be in the form of a fluid, indicated by the arrow F in FIG. 10c. Functionally, this configuration (which is not illustrated per se) corresponds to the configuration illustrated in FIGS. 6, 7a and 7b and discussed above (i.e. a check valve configuration).

A common principle of both of the embodiments of the invented valve device is the dual capability of functioning both as check valve and as a full opening safety valve, and wherein the change between these two configurations may be effectuated by moving a valve member (e.g. the ball valve 7 or the valve head 29) inside the valve body 2. Preferably, the valve member is moved along the body longitudinal axis y. The valve member is preferably moved with respect to the valve cage.

It should be understood that the invented safety valve device may be made of any material suitable for the intended use, for example stainless steel.

Although the invention has been described with reference to a coil spring 8, it should be understood that other resilient members may be equally applicable.

The invention claimed is:

1. A drill string safety valve device, comprising:
a body with a through-going flow bore and connectors at respective ends of the flow bore for connection to tubulars; and
a valve member movably arranged in said flow bore and configured for being locked into one of two states, wherein a first state of the valve member allows fluid to flow in both directions though the flow bore, and wherein a second state of the valve member allows fluid flow through the flow bore in only one direction.

2. The drill string safety valve device of claim 1, wherein the valve member comprises guide-and-support means, whereby the valve be moved between the two states.

3. The drill string safety valve device of claim 1, wherein the valve member is movably arranged on a first support member.

4. The drill string safety valve device of claim 1, wherein the valve member is configured to bear against a first valve seat.

5. The drill string safety valve device of claim 4, wherein the first valve seat is arranged on a first support member.

6. The drill string safety valve device of claim 1, further comprising a resilient element configured to exert a force on the valve member.

7. The drill string safety valve device of claim 1, wherein the valve member comprises a rotatable ball valve having a through-going flow bore.

8. The drill string safety valve device of claim 1, wherein the valve member comprises a valve head movably connected to a second support member, and the second support member movably connected to a first support member.

9. The drill string safety valve device of claim 1, further comprising operating means configured for operating the valve member between said two states.

10. The drill string safety valve device of claim 1, wherein the body is a tubular body having an outer diameter (OD) corresponding to the outer diameter of the tubulars to which it may be connected.

11. The drill string safety valve device of claim 9, wherein the operating means is further configured to lock the valve member into one of the two states.

\* \* \* \* \*